United States Patent [19]

Harr et al.

[11] Patent Number: 4,535,371

[45] Date of Patent: Aug. 13, 1985

[54] RECORDING CHANNEL WITH SIGNAL CONTROLLED INTEGRATED ANALOG CIRCUITS

[75] Inventors: Jerome D. Harr, San Jose; Karl R. Hense, Los Altos, both of Calif.

[73] Assignee: International Business Machines Corporation, Armonk, N.Y.

[21] Appl. No.: 494,822

[22] Filed: May 16, 1983

[51] Int. Cl.³ ............................ G11B 5/02; G11B 5/09
[52] U.S. Cl. ............................................ 360/67; 360/46
[58] Field of Search ............................ 360/67, 46, 68

[56] References Cited

U.S. PATENT DOCUMENTS

| | | | |
|---|---|---|---|
| 3,465,321 | 9/1969 | Reisfeld | 360/67 |
| 4,279,005 | 7/1981 | Kitamura et al. | 360/66 |
| 4,371,901 | 2/1983 | Shah | 360/67 |

*Primary Examiner*—Vincent P. Canney

*Attorney, Agent, or Firm*—Richard E. Cummins; Henry E. Otto, Jr.

[57] ABSTRACT

A recording channel for a disk file including analog circuits implemented in integrated circuits whose frequency dependent parameters are controllable in response to the value of a control signal supplied to the circuit, as determined by a digital signal. In the preferred embodiment, the control signal to each analog circuit is from a digital to analog converter that is supplied with a digital signal from a register that is addressable and settable from a programmed microcontroller. Certain registers are able to be incremented or decremented by separate clock pulses and function as counters that are controlled by a signal in a feedback path separate from the microcontroller. Components external to the integrated circuits are, therefore, avoided while still maintaining the ability to adjust the analog read circuits to be responsive to data rates of different frequencies.

14 Claims, 3 Drawing Figures

RECORDING CHANNEL WITH SIGNAL CONTROLLED INTEGRATED ANALOG CIRCUITS

BACKGROUND OF INVENTION

1. Field of Invention

This invention relates in general to magnetic recording and reading systems for disk files and, in particular, to improved digitally controlled read/write channels for disk files.

2. Cross-Referenced Applications

Ser. No. 495,322, filed concurrently herewith in the name of Harr, entitled "Integrated Circuit Filter with Adjustable Characteristics", and commonly assigned, describes a current controlled integrated circuit filter that may be employed in the recording channel of the present invention.

3. Description of the Prior Art

Disk files are used extensively for the storage of data in data processing systems. The term "recording channel of a disk file" includes the "write" circuits and the "read" circuits. The write circuits function to convert a byte of binary data as it exists in a register of the file to the flow of current through the write coil of a magnetic transducer which produces magnetic flux that magnetizes the disk surface in some predetermined pattern which represents the data. The "read circuits" function to convert the current in the read winding of the magnetic transducer which is induced as the read winding is moved relative to the recorded flux pattern to a byte of binary data in another register in the file. While the "read" and "write" functions of the read/write channel both generally involve analog and digital type circuits, the "read" circuits are predominantly implemented in analog type circuits.

Generally, the write channel only includes an analog write amplifier circuit with the remaining signal processing and control circuits being digital in nature. In contrast, the read channel includes an analog read amplifier and an analog variable gain amplifier circuit which is connected to the read amplifier by a direct current (DC) blocking capacitor. The output of the VGA or variable gain amplifier circuit is generally supplied to the data detector circuit through a passive filter network and another amplifier. Depending on the type of signal detecting process employed, e.g., peak detecting, slope detecting, etc., the read channel detector generally also includes a number of analog functions such as signal differentiation, threshold setting circuits, delay circuits, and a single shot circuit which eventually converts the information contained in the analog signal to a binary digital output signal that is then stored in a static register.

Because of the frequency dependent nature of the analog type circuits, a recording channel must necessarily be tailored to the operating specifications of a given disk file, specifically those which are frequency and amplitude dependent, such as recording density, data rate, rotational speed of the disks, etc.

In the past, where the signal processing and control circuits were implemented in circuit technologies involving discrete components, the problem of redesigning the recording channel when, for example, the data rate increased, could be achieved in a relatively short period of time because of the nature of discrete component technology. As integrated circuit technologies have improved, a tremendous cost advantage has been established for implementing circuits in LSI (large scale integration) or VLSI (very large scale integration) technology. Implementing circuit functions in VLSI technology, however, does require the circuit designer to specify the various design parameters prior to actual implementation and imposes a rather long turnaround time, for example, six months, to effect a subsequent change in even one of the parameters in the circuit, no matter how trivial that change may be. Since many of the design parameters of the recording channel are so interdependent on other areas of the disk file that are being developed in parallel with the recording channel, provision must generally be made external to the IC chip set to modify or trim certain parameters which are built into the chip. As a result, the integrated chips for the recording channel are surrounded by AC coupling capacitors, filter inductors and capacitors, and level setting resistors which cost card and module space and increase the manufacturing cost of the recording channel. These external components also tend to degrade the overall operation of the read/write channel. The flexibility of such an approach is also limited to merely tailoring the basic channel characteristics within relatively narrow ranges and cannot be employed in connection with another disk file having different frequency dependent characteristics.

It would, therefore, be advantageous to have a recording channel VLSI implementation in which minor adjustments could be made to the various circuit functions within the channel to tailor the various functions to the particular channel and also have the ability to change within relatively large ranges the operating characteristics of the circuits so that, basically, the same recording circuits could be employed in different disk files. The present invention provides such a recording channel.

The present invention is directed to a recording channel implementation in which the analog circuits of the recording channel are implemented in VLSI technologies and controlled by a microprocessor through various control circuits which are also implemented in the same VLSI technology on the same chip, thereby eliminating substantially all of the external components employed in the prior art recording channel implementations.

SUMMARY OF THE INVENTION

In accordance with the present invention, the recording channel is implemented in VLSI technology so that each function of the connected analog circuits is provided with its separate control circuits that are also integrated on the same chip. The control circuits associated with each analog function of the recording channel comprise a digital analog convertor (DAC) and a register. The DAC supplies a control signal to adjust the operation of the analog circuit. The value of the control signal is determined by the control data placed in the associated register. The control data to the register is supplied, for example, from a microcontroller which can be programmed to provide appropriate data to the register to modify the operation of the recording channel, in accordance with an operator's command or in response to data supplied automatically to the microprocessor from other parts of the file system.

It is therefore an object of the present invention to provide an improved recording channel for a disk file which is implemented totally in integrated circuit technologies.

A further object of the present invention is to provide an improved recording channel for a disk file which comprises integrated circuits that do not require components externally mounted to the circuiit chip to modify the operation of the circuits that are integrated on the chip.

A still further object of the present invention is to produce an improved recording channel for a disk file whose frequency and time dependent characteristics are controllable during operation of the channel.

The foregoing and other objects, features and advantages of the invention will be apparent from the following more particular description of a preferred embodiment of the invention as illustrated in the accompanying drawings.

DESCRIPTION OF THE PREFERRED EMBODIMENT

Figure 1:
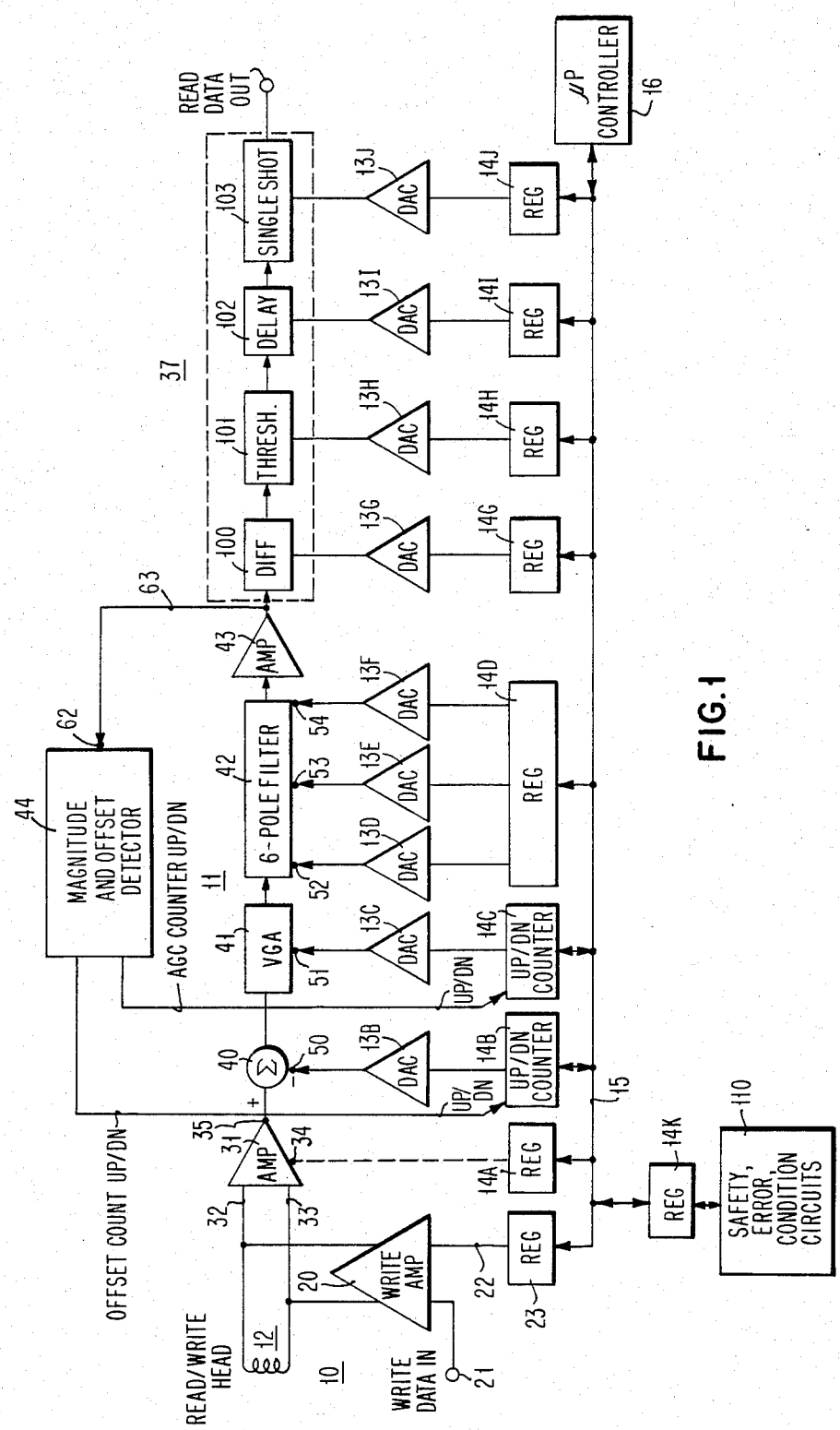
FIG. 1 is a block diagram of a recording channel embodying the present invention.

The recording channel shown in FIG. 1 comprises generally a write channel 10 and a read channel 11 which are connected to a read/write transducer 12 of a disk file (not shown). The recording channel further includes a plurality of digital to analog convertors 13, plurality of register 14 which are settable and addressable in accordance with binary data signals supplied on an address/data bus 15 from the microcontroller 16. Any suitable microcontroller known in the art may be employed for the microcontroller 16 shown in FIG. 1. Similarly the address/data bus 15 is a conventional bidirectional data bus which functions to transfer a byte of data between the controller and the register parallel by bit over 8 separate lines. The register is addressed or selected by the microcontroller 16 by sending an n-bit address over a set of n-address lines which together form the address section of bus 15. The microcontroller can also interrogate the contents of the register at any time and transfer the value back to the microprocessor.

The write circuits as shown comprise write amplifier 20 which includes a "write data-in" terminal 21 which receives a binary signal representing data from a write driver (not shown). Write amplifier 20 further includes a control terminal 22 which is connected to receive a control signal from a register 23. The control signal from register 23 sets the gain of the write amplifier in any of the various known prior art techniques. The need to vary the gain of the write amplifier is based on the fact that the amount of write current required in the coil of the magnetic transducer will of course vary depending, for example, on the type of magnetic coating on the disk and and should also be varied in accordance with the radial position of the transducer relative to the disk surface since the flying characteristics of the head-disk system are dependent on the speed of the disk along with other parameters of the head-disk system.

The read channel 11 includes circuits comprising a read amplifier 31 which has its input terminals 32, 33 connected to the coil of the R/W transducer 12. Read amplifier 31 is provided with a control terminal 34 which is connected to the output of register 14A. Register 14A is loaded from the microcontroller 16 with a byte of data that sets the gain of read amplifier 34. The details of the gain setting technique are not shown since they form no part of the present invention and since various techniques known in the prior art for implementing an integrated circuit variable gain amplifier may be employed.

Since there are several advantages to having the read and write amplifier as close to the read/write head as possible, this amplifier may be implemented in a separate chip that can be mounted on the head arm and connected to the rest of the recording channel by suitable cables.

The output terminal 35 of the read amplifier 31 is supplied to the detector portion of the recording channel through a series of analog circuits which are individually controlled from the microprocessor and are referred to generally as the offset and gain control circuits. Since the recording channel employs a peak detecting technique to determine the binary significance of the data being read from the disk, the function of the circuits between the output terminal 35 of the read amplifier 31 and the input to the peak detector 37 is to adjust the level of the signal supplied to the detector from amplifier 31. The level adjusting portion of the read channel comprising summing junction 40, a variable gain amplifier 41, a filter 42, and another amplifier 43. A magnitude and offset detector 44 is also employed and functions to measure the signals from the output of amplifier 43 that is supplied to the peak detector and provide a feedback signal in the form of up/down commands to the counter/registers 14B and 14C. Register 14B has its output connected to one input 50 of summing junction 40 through digital to analog convertor 13B. Similarly counting register 14C has its output connected to the control terminal 51 of the variable gain amplifier 41 through the digital to analog convertor 13C.

Register 14D has its output connected through DAC 13D, 13E and 13F which provide control signals to the control terminals 52, 53 and 54 of the 6 pole filter 42. These control signals vary the pole positions of the integrated circuit filter in the manner described and claimed in the aforementioned copending application Ser. No. 495,322.

The output of filter 42 is supplied to amplifier 43.

Figure 2:
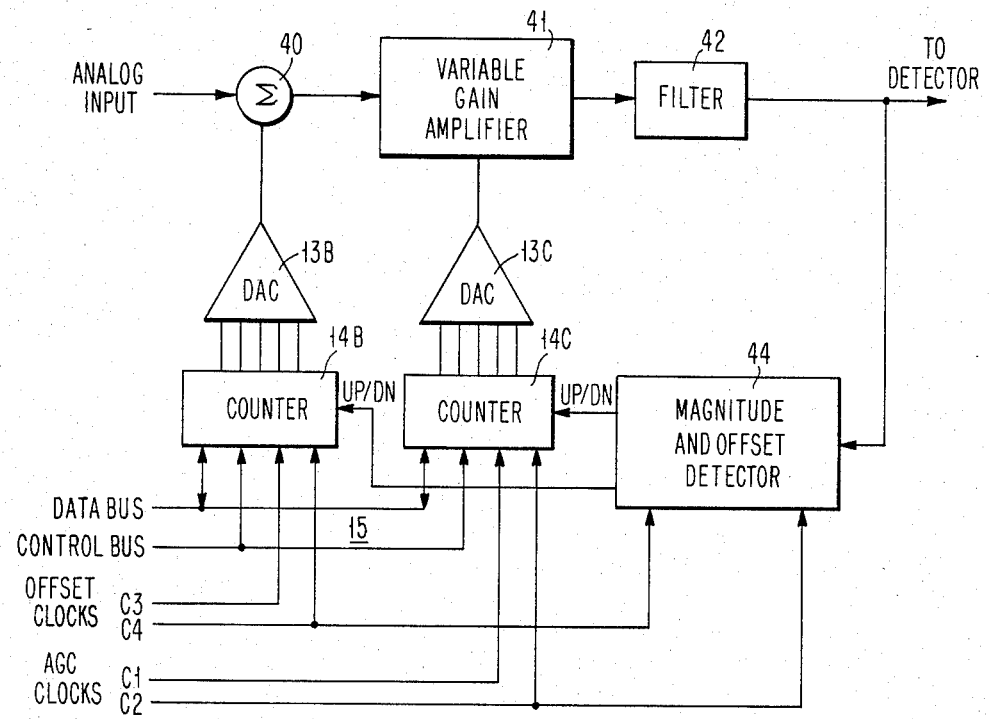
FIG. 2 is a schematic diagram of a portion of the channel shown in FIG. 3 illustrating the interconnection and control of some of the analog circuits.

FIG. 2 shows the offset and gain control circuits shown in FIG. 1 in more detail. The functional blocks shown in FIG.2 which correspond to similar blocks in FIG. 1 have been designated by the same reference characters.

As indicated earlier in the specifications, the functions of the offset and gain control circuits are to adjust the differential offset and gain of the signal from the read amplifier so that the signal presented to the peak detector has a zero DC offset and is at the proper peak to peak amplitude. Normally a zero offset is obtained by a coupling capacitor which would function to eliminate any DC component from the signal from the read amplifier. The same result is achieved in the summing junction 40 by combining the input signal with an offset signal derived from the digital analog converter 13B. The amount of offset is controlled by the state of counter 14B which is incremented or decremented under the control of the magnitude and offset detecting circuit 44 and may be set with an initial value from the microcontroller 16 which has been supplied to the register on bus 15.

Figure 3:
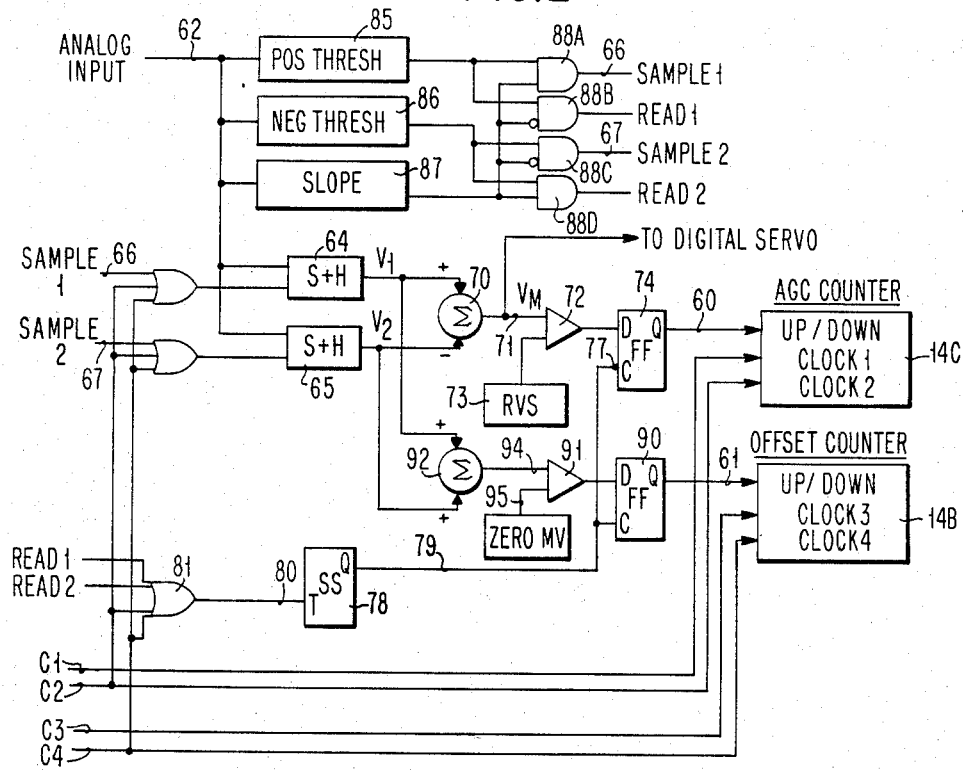
FIG. 3 is a block diagram of the logic for the magnitude and offset detector shown in FIG. 2.

The magnitude and offset detector as shown in detail in FIG. 3 monitors the signal being supplied to the peak detector to control the counter 14B and the counter 14C. The variable gain amplifier 41 is controlled in an identical manner by means of DAC 13C and counter register 14C.

Counter registers 14B and 14C each include a pair of clock input lines. Clock lines C1 and C2 are applied to counter 14C while clock lines C3 and C4 are applied to counter register 14B. Clock lines C2 and C4 are also supplied to the detector circuit 44. The details of the detector circuit 44 are shown in FIG. 3 and described later in the specification. It should be noted that the disclosed arrangement for eliminating the DC offset from the read signal provided by the read amplifier has several advantages over the conventional DC coupling capacitor techniques employeed in the prior art recording channels. Generally in a disk file the recording channel is reading the selected track looking for an addressed record which is somewhere positioned along the track. This is particularly true when the data in the file is formatted in a count key and data (CKD) type of format. When the addressed record is detected and data must be written, the recording channel must be switched from the reading mode to the writing mode and then after writing again switched back to the reading mode. When a capacitor is employed to eliminate the DC offset, the time required to discharge and recharge the capacitor between read operations requires the data on the disk to be spaced apart a distance corresponding to the time required for the offset capacitor to readjust. With the disclosed arrangement in which the counter 14B can be set by the microprocessor, it is not necessary to space the data field apart and hence storage capacity on the disk can be increased. Further, if the file employs a track following servo system, the value of counter 14C may be read from the counter by the microcontroller 16 and provide useful data to the circuits of the servo system that generate the position error signal. The value of counter 14c supplied to the DAC 13C sets the gain of the variable gain amplifier 41 rather than some voltage stored on another externally mounted capacitor as suggested in prior art recording channels.

The details and operation of the magnitude and offset detector circuit 44 shown in FIG. 2 and its operation will now be described in connection with FIG. 3.

The overall function of the magnitude and offset detector shown in FIG. 3 is to provide a counter direction control signal to the automatic gain control counter/register 14C on line 60 and a counter direction control signal to the offset counter/register 14B on line 61 in response to the analog read signal being supplied to the peak detector 37 from the output of amplifier 43. Signal line 63 connects the output of amplifier 43 to the input 62 of the magnitude and offset detector 44. It will be assumed for purposes of explanation that by increasing the counter value of the AGC counter/register 14C, the gain of the variable gain amplifier 41 is increased and by decrementing the counter value, the gain is decreased. The means for developing the counter directional control signal for the automatic gain control counter 14C comprises a pair of sample and hold circuits 64, 65 which function respectively to maintain voltage signals V1 and V2 which correspond to the values of the analog input signal applied to terminal 62 at the times of occurrence of the Sample 1 and Sample 2 signals, respectively, which are supplied on lines 66 and 67. Sample 1 signal occurs at the positive peak of the analog read data signal while Sample 2 signal appears at the negative peak of the analog read data signal. Summing junction 70, which functions as an algebraic differentiating circuit, receives signals V1 and V2 and provides an output signal on line 71 which represents the peak to peak voltage difference VM between the two peaks. The VM signal is supplied to one input of the AGC comparator 72 which has a second input connected to a reference voltage source (RVS) 73. The output of the comparator 72 is supplied to flip flop 74 whose output then represents the AGC counter/register direction control signal on line 60. If the signal VM on line 71 is less than the RVS voltage, the counter control signal line 60 will control the counter count direction to increment the counter when the clock signals C1 and C2 which are out of phase are applied to the counter/register 14C. C1 and C2 may be generated by any suitable clock circuit. The use of two out of phase clock signals to drive the counter 14C assumes that the counter is implemented with a 2 stage flip flop that requires this type of out of phase clock signals. Flip flop 74 includes an input terminal 77 which is connected to a single shot 78 by line 79. A pair of signals Read 1 and Read 2 are supplied to input terminal 80 along with clock signals C2 and C4 through an OR-gate 81. Operation of the single shot 78 by a signal at terminal 80 causes the flip flop 74 to be set in accordance with the value of the signal from the comparator 72.

The means for generating the Sample 1 and Sample 2 signals and Read 1 and Read 2 signals comprises the positive threshold detector 85, the negative threshold 86 and the slope detector 87. Also included is the logic represented by and gates 88A through 88D.

The output of the positive and negative threshold detectors 85 and 86 are gated by the output of the slope detector 87 to provide the Sample 1, Sample 2, Read 1 and Read 2 signals.

It will be noted that the sample-and-hold circuits 64 and 65 are operated by the asynchronous clock signals C2 and C4, in addition to the Sample 1 and Sample 2 signals. These clock pulses occur quite infrequently as compared with the Sample 1 and Sample 2 signals. The clock signals are used to force random samples to insure self-correction during start-up. These random samples do not affect the operation during normal operation of the system.

A similar arrangement for controlling the offset counter involves offset flip flop 90, offset comparator 91 and offset summing junction 92. The input line 94 to the comparator 91 from junction 92 reflects the algebraic sum of the positive and negative peak values. The other input to comparator 91 is a zero reference value on line 95.

The method of controlling the counter/register 14B is similar to that described in connection with the description of the control of counter/register 14C.

Asynchronous samples occur during this period, but they are followed with valid samples, controlled by the threshold and slope circuits. The last sample to occur (before clocking) determines the setup for the counters. During normal operation, valid samples come at a much higher rate than asynchronous samples, and valid samples determine the up/down state of the counters.

The AGC and offset clocks are independent of each other and run at different frequencies to provide separate response times.

The operation of the magnitude and offset detector arrangement shown in FIG. 3 is generally as follows. During start-up the magnitude offset portion of the system may be severely out of balance. Saturation and clipping may or may not occur and the magnitude or offset measurements could be inaccurate. Inaccurate measurements are permissible if they still cause the appropriate response in the counters and bring the system to a balanced state. In the case of magnitude, the detector discriminates at a set level, e.g. 200 mV and all responses are based on whether the signal is greater than 200 mV or less than 200 mV. It is really not necessary to know exactly how much a signal is greater than or less than the 200 mV level which has been set. It is only necessary to know that it is greater than or less than it should be. In the case of the offset detector, the level is zero so it is only necessary to know if the net result is positive or negative.

In most cases, when inaccurate measurements occur, they still cause the correct response. There are a few extreme cases where an inaccurate measurement can cause an incorrect response. However when this happens only one of the two measurements will be in error at one time and at least one of the two correction loops will give the correct response. The loop that has the correct response always self-corrects and removes the condition that causes the other loop measurement to be inaccurate. The system is therefore a self-correcting and start-up is assured. During a normal operation saturation and clipping do not occur. Measurements are always accurate and each loop independently maintains itself.

The following is an example of a start-up from an extreme position. Assume that the magnitude is 200 mV and that the offset is −700 mV. The magnitude of the signal is completely masked by the severe offset that is present and the signal is clipped at a level of −400 mV. Synchronous samples are not available because the signal is not crossing the threshold in normal sequence and as a result Sample 1 and Sample 2 signals and Read 1 and Read 2 signals are not operative in their normal fashion. Therefore asynchronous samples are taken as a result of the clocks. The magnitude indicated is 0 mV and the offset indicated is highly negative. The magnitude measurements are incorrect; however, the offset polarity measurement is correct. The path of correction taken will depend on the relative response times of the AGC correction and the offset correction circuits.

If it is assumed the offset correction response is faster than the AGC correction, the following occurs. Offset will start correcting itself to make it less negative than it is. As the offset changes from −700 mV to zero, the magnitude measurement becomes valid. When both measurements are valid, both loops correct themselves. A more complicated situation occurs if it is assumed that the AGC correction response is faster than the offset response. In this case, the AGC correction sees a magnitude of less than 200 mV. The AGC response increases the gain of the variable gain amplifier and continues to do so until the indicated magnitude (as measured by the detector) is 200 mV.. The AGC will continually adjust the gain to maintain this indicated magnitude. During the time that AGC is maintaining the indicated magnitude at 200 mV, the offset is still effective and even though it is running at a slower rate, the offset will eventually correct itself. When the offset reduces itself sufficiently, the indicated magnitude becomes valid and both loops correct themselves independently.

Referring again to FIG. 1, the recording channel further includes the 6 pole filter 42, the DACs 13D through 13F and register 14D. The microcontroller 16 provides signals to the register 14D to control the three pole pairs of the filter. The filter can be adjusted over a frequency range from about 10 MHz up to about 50 MHz. Depending on the value supplied to the register, the pole pairs may be positioned to implement a Butterworth type filter or an elliptical filter or other types, depending on the setting of the pole pairs. The details of the filters are disclosed and claimed in the cross-referenced application which is incorporated herein by reference. As discussed in that application, the control signals for the filter are control currents.

The remaining portion of the recording channel shown in FIG. 1 is referred to as the peak detector 37. It contains a differentiator 100 to extract peak position information, a threshold circuit 101 to provide peak amplitude information, a delay circuit 102, and a single-shot 103. In addition, DACs 13G–J and registers 14G–J are provided.

These circuits provide a digital train of pulses that give delayed timing information about the time positions of the peaks of the input waveform. The peak detector 37 can handle waveforms with peaks separated from 20 to 100 nanoseconds. To be able to cover this range, the microcontroller 16 loads the peak detector registers 14G–J with values appropriate to the read signal data rate to be handled. Specifically:

1. The differentiator register 14G is loaded with a value that controls the roll-off frequency of the differentiator 100. This is the frequency at which the circuit gain stops increasing with frequency. This decreases the high frequency noise sensitivity.
2. The threshold register 14H receives a threshold value to use. This value is primarily dependent on the head/disk interface recording and density. In some recording technologies, the ideal value can vary from inner tracks to outer tracks, from one head/disk combination to another. So, the value loaded by microcontroller 16 could be custom tailored to a particular disk drive and track.
3. The delay 102 is adjusted according to the data rate of the system.
4. The single-shot 103 is adjusted by the data in register 14J to adjust the width of the output pulse Also connected to the bus 15 are the safety, error and condition circuits 110. These circuits sense the states of various circuits inside the channel, and make this information available to the microprocessor by setting up the register 14K, which can then be interrogated through the bus 15. The microprocessor can also set certain conditions by loading data into that register 14K.

The recording channel just described and illustrated in FIG. 1 has many unique features. First, since the external components have been eliminated, the channel can be completely integrated on one or more chips. This results in less card and module space, less expense, and improved reliability. Secondly, since the offset and gain are program controlled, the channel can be immediately ready for a read following a write operation, eliminating the long interrecord gap.

Since the channel characteristics are determined by the computer, each machine can have its own unique channel characteristics, specially tailored for the particular head disk assembly (HDA) in that machine, or even for the particular arm in the HDA. These characteristics can either be determined during final test, or the microprocessor program can be made adaptable so that it can determine what set of characteristics give the lowest bit error rate, give the best off track performance, etc. That way, if the optimum characteristics change over the life of the machine, the program can adapt to these changes to maintain high performance. Also, since the channel characteristics are not hardwired in but are program controlled, changes can be very easily made without requiring module design changes or rework.

Since the channel characteristics can be quickly loaded from the microcontroller, they can be changed from track to track. This would be useful, for example, in banded recording, where going from inner bands to outer bands causes signal bandwidth to change substantially. For good noise rejection, the filter bandwidth should follow the signal bandwidth changes to reject noise outside of the passband. Also, the microcontroller can make use of the channel programmability to assist error recovery. Suppose a hard error is encountered on a particular record due to a partial bit drop out. The microprocessor could lower the threshold to see if the bit could be picked up and the error corrected. Changing filter type, bandwidth or peaking could be tried to emphasize or shift the offending bit enough to satisfy the error correcting code.

Another feature is the ability to do self diagnostics. The offset adjust circuit is a circuit that adds a voltage to the input signal. In the absence of an input signal, the offset can provide test voltages to the rest of the channel. This could be used to check for signal path continuity, check threshold values, measure amplifier gains, etc.

As mentioned previously, the channel data rate is controlled by the microcontroller. As a result, the channel chip can be employed in more than one machine, even though the data rates varied substantially.

Also, it will be recognized that while the preferred embodiment of the invention has been described as a recording channel for processing signals originating in a magnetic storage environment, it should be recognized that signals generated from data stored in other types of data storage devices, such as optical, may be processed by the disclosed arrangement with the same advantages.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new and desire to secure by Letters Patent is:

1. A recording channel for a data storage file including means for converting the signal in the read transducer to a binary digital signal having a value which corresponds to the value of stored data that produced said signal, said converting means comprising:
   a plurality of integrated circuits including
   (1) a read amplifier having its input connected to said read transducer;
   (2) a peak detector including an input terminal, a first set of interconnected analog circuits and a digital output circuit to provide said binary digital signal, and at least one control terminal for each of said circuits of said peak detector to permit the adjustment of an operating parameter of each said circuit of said peak detector in accordance with a control signal supplied to said at least one control terminal; and
   (3) circuit means including
   (a) a second set of analog circuits connected betwen said read amplifier and said input terminal of said peak detector to
   (i) maintain the amplitude of said signal supplied to said peak detector at a predetermined amplitude independent of the output of said read amplifier; and
   (ii) eliminate any DC component present in the signal supplied from said read amplifier; and
   (b) means for dynamically and continuously adjusting preselected parameters of said second set of analog circuits, including means for developing control signals for said second set of analog circuits in accordance with the signal supplied to said peak detector.

2. The recording channel set forth in claim 1 in which said data storage file is a magnetic disk file, said transducer is a magnetic transducer having a read element, and said read amplifier has an adjustable gain.

3. The recording channel set forth in claim 1 in which said second set of analog circuits includes a summing junction having a first input terminal connected to the output of said read amplifier and a second input terminal connected to said means for developing control signals.

4. The recording channel set forth in claim 3 in which said second set of analog circuits further includes a variable gain amplifier having an input terminal coupled to receive the output signal from said summing junction and a gain control terminal connected to said means for developing control signals.

5. The recording channel set forth in claim 3 in which said means for developing control signals includes a first counter/register, a first digital to analog converter connected between said first counter/register and said second input terminal of said summing junction, first means for selectively incrementing or decrementing said first counter/register in response to first clock signals and a counter direction control signal.

6. The combination recited in claim 5 in which said first means for selectively incrementing or decrementing said first counter/register includes an offset detector connected in a feedback loop which extends from the output of said second set of analog circuits to said means for developing control signals to control the count direction of said first counter/register so as to reduce the zero any DC component in the signal supplied to said peak detector from said second set of analog circuits.

7. The recording channel set forth in claim 5 in which said means for developing control signals includes a second counter/register, a second digital to analog converter connected between said second counter/register and said gain control terminal of said variable gain amplifier and second means for selectively incrementing or decrementing said second counter/register in response to second clock signals and a second counter direction control signal.

8. The combination recited in claim 7 in which said second means for selectively incrementing or decrementing said counter/register includes a signal magnitude detector connected in a feedback path which extends from the output of said second set of analog circuits to said means for developing control signals to control the counter direction of said second counter/register so as to maintain the amplitude of the signal supplied to said peak detector from said second set of analog circuits at a predetermined value substantially independent of the value of the signal from said read amplifier.

9. The recording channel set forth in claim 1 in which said second set of analog circuits includes a summing junction and a variable gain amplifier, said summing junction having a first input terminal connected to the output of said read amplifier and a second control input terminal and an output terminal connected to the input of said variable gain amplifier, said variable gain amplifier having a control signal input terminal and means connecting said control input terminals to said means for developing control signals.

10. The recording channel set forth in claim 9 in which said means for developing control signals comprises:
   (1) first means for supplying to said summing junction a first control signal, the value of which tends to reduce to zero any DC component in the signal supplied from said read amplifier; and
   (2) second means for supplying to said variable gain amplifier a second control signal, the value of which tends to maintain the amplitude of the signal supplied to said peak detector at a predetermined value.

11. The recording channel set forth in claim 10 in which said first and second means for supplying each include a counter/register and an analog to digital converter.

12. The recording channel set forth in claim 1 in which said means for adjusting comprises a register or counter and a digital to analog converter associated with each said analog circuit of said second set of analog circuits.

13. The recording channel set forth in claim 12 further including a microcontroller and an address/data bus interconnecting said microcontroller to each said register and counter.

14. A recording channel for a data storage file including means for converting the signal in the read transducer to a binary digital signal having a value which corresponds to the value of stored data that produced said signal, said converting means comprising:
   a plurality of integrated circuits including
   (1) a read amplifier having its input connected to said read transducer;
   (2) a peak detector including an input terminal, a first set of interconnected analog circuits and a digital output circuits to provide said binary digital signal, and at least one control terminal for each of said circuits of said peak detector to permit the adjustment of an operating parameter of each said circuit of said peak detector in accordance with a control signal supplied to said at least one control terminal; and
   (3) circuit means including
   (a) a second set of analog circuits connected between said read amplifier and said input terminal of said peak detector to
      (i) maintain the amplitude of said signal supplied to said peak detector at a predetermined amplitude independent of the output of said read amplifier; and
      (ii) eliminate any DC component present in the signal supplied from said read amplifier; and
   (b) means for adjusting preselected parameters of said second set of analog circuits, including means for developing control signals for said second set of analog circuits in accordance with the signal supplied to said peak detector, and further including a summing junction having a first input terminal connected to the output of said read amplifier and a second input terminal connected to said means for developing control signals.

* * * * *